(12) United States Patent
Ellis et al.

(10) Patent No.: US 10,602,748 B1
(45) Date of Patent: Mar. 31, 2020

(54) ACTIVE/PASSIVE THERMAL CONTROL SYSTEM UTILIZING LIQUID NITROGEN

(71) Applicants: Daniel Scott Ellis, Clinton, UT (US); William Grant Moon, Provo, UT (US); Steven Victor Boyce, Spanish Fork, UT (US); Denton Journeay Markwalter, Provo, UT (US)

(72) Inventors: Daniel Scott Ellis, Clinton, UT (US); William Grant Moon, Provo, UT (US); Steven Victor Boyce, Spanish Fork, UT (US); Denton Journeay Markwalter, Provo, UT (US)

(73) Assignee: Reflect Scientific Inc., Provo, UT (US)

( * ) Notice: Subject to any disclaimer, the term of this patent is extended or adjusted under 35 U.S.C. 154(b) by 0 days.

(21) Appl. No.: 16/282,424

(22) Filed: Feb. 22, 2019

(51) Int. Cl.
  *A23B 4/06* (2006.01)
  *A23L 3/00* (2006.01)
  *F25D 3/10* (2006.01)
  *A23L 3/36* (2006.01)

(52) U.S. Cl.
  CPC .............. *A23B 4/068* (2013.01); *A23L 3/001* (2013.01); *A23L 3/364* (2013.01); *F25D 3/105* (2013.01); *A23V 2002/00* (2013.01)

(58) Field of Classification Search
  CPC ......... A23B 4/068; A23L 3/001; A23L 3/364; F25D 3/105; B60H 1/00364
  USPC ........................................................ 62/457.9
  See application file for complete search history.

(56) References Cited

U.S. PATENT DOCUMENTS

| | | | | |
|---|---|---|---|---|
| 5,125,237 | A | * | 6/1992 | Saia, III .............. B60H 1/3226 62/239 |
| 2006/0288731 | A1 | * | 12/2006 | Atkins ...................... F25D 9/00 62/457.9 |
| 2015/0107292 | A1 | * | 4/2015 | Cousaert ................... F25D 3/06 62/457.2 |
| 2017/0321947 | A1 | * | 11/2017 | Zvida ....................... F25D 3/107 |
| 2019/0195547 | A1 | * | 6/2019 | Moon .................... F25D 29/001 |

* cited by examiner

*Primary Examiner* — Marc E Norman
(74) *Attorney, Agent, or Firm* — Tran & Associates

(57) ABSTRACT

An active/passive freezer system includes the capability to both actively cool a payload bay and passively maintain close to that temperature for extended periods of time; a freezer unit with a payload bay that can rapidly reduce its internal temperature; a thermal battery; a heat exchanger where liquid Nitrogen flows through; insulation that significantly reduces heat gain from external sources; and the capability to have separate units for cooling the payload bay and maintaining the temperature within the payload bay.

20 Claims, 16 Drawing Sheets

ACTIVE/PASSIVE THERMAL CONTROL SYSTEM UTILIZING LIQUID NITROGEN

FIELD OF INVENTION

The present invention relates to a thermal control system.

BACKGROUND OF THE INVENTION

According to FDA guidelines, fish is considered sushi-grade when it has been frozen and stored at or lower than −20 degrees Celsius for 7 days, or other comparable temperatures and times. The reason for this being to ensure the death of parasites within the fish. Other fish are frozen only for convenience and are still intended to be cooked. All meats, not just fish, begin to spoil above certain temperatures, as do many other forms of produce and products. The quality of such products is also directly influenced by how low of a temperature they were frozen at. For example, it is widely accepted that the quality of fish, in particular sushi-grade fish, is maintained to a greater standard when frozen lower and quicker. Some even consider the quality of the fish to be enhanced by freezing in such ways. Water expands when freezing, thus causing degradation of texture and quality of products with high-water content. The slower and higher this freezing process occurs, the more degradation happens. It is also believed by some that the quality of certain meats begins to degrade above certain temperatures even if these temperatures are below the freezing point of water. It is easy to see that so-called "freezer-burn" is a common and unavoidable effect of storing items in temperature below yet close to the freezing point of water. These effects are decreased the lower the temperature is at which such products are placed. Thus, the ability to quickly freeze products, specifically meat, to extremely low temperatures and maintain such low temperatures is a desirable one, if not a required one.

In the transportation industry, current state-of-the-art methods for transporting frozen products are either unreliable or overly complex to manage. The typical transportation of fish in particular is extremely unreliable. Typical methods include placing ice or ice packs in, around, or on top of the fish to maintain its temperature. This isn't ideal because: 1. The freezing temperature for ice or typical ice packs is relatively high and can't absorb much heat energy, and 2. These methods cannot maintain extremely low temperatures for significant periods of time. While using ice to passively cool fish is extremely easy it is also extremely unreliable. While active methods are available, these methods are expensive. They include reefer trailers that cost tens of thousands of US dollars and are only capable of being used for the specific purpose of transporting by highway. The uses of such units are also limited by the standard compressor-based technology.

Current state-of-the-art technologies for transporting temperature sensitive products by air are bulky and extremely energy consumptive if they provide active thermal control, due to their compressor-based technology. Passive methods of cooling products during transportation through the air are unreliable in the same way that the typical transportation of fish is unreliable. Increased passive cooling capability occurs when dry ice is used in place of regular ice, but this method is complex and can be dangerous, and in general is impractical.

Certain freezing temperatures are required for many products' quality to be maintained within reasonable limits, specifically meat. This creates complications with the supply chain. These temperature requirements can greatly increase the complexity, energy consumption, and risk of quality loss. For cargo being transported by air specifically, it is preferable to decrease mass as much as possible, to not carry pressurized gases during flight, to not have large energy consumption requirements, and to not be transporting hazardous materials. This effectively rules out all methods of active freezing. Passive freezing can be utilized, but the most common methods—such as using ice, dry ice, gel packs, and insulation quilts—are imprecise and easily influenced by outside factors, thus putting at risk the quality of the product being transported. The need for a reliable and effective passive method of thermal control is demonstrated.

Cold chain methods often utilize different devices for thermal control throughout the cargo's lifetime. This creates complications. For example, a Bluefin Tuna is caught near Japan and blast-frozen on the fishing boat. This frozen tuna is transported out of these freezers into a storage freezer on the boat and then later to yet another storage freezer after the boat docks. The tuna is then moved to a shipping container where it is transported to a storage freezer in Los Angeles. It is then transported to restaurants, fish markets, or grocery stores where the consumer purchases it. Many steps are involved in which the tuna is transferred between freezers, allowing for greater chance of quality degradation to occur. This example is also assuming that the fish is always within a freezer except when being transported from one freezer to another. In practice, fish are often transported with only ice to maintain its low temperature, giving even more opportunity for quality degradation to occur. Thus, it is desirable to have a simpler method of maintaining low temperatures throughout the lifetime of the cold chain process of perishable goods.

Common methods for passive thermal control include packing perishables in water ice, dry ice, gel packs, or wrapping them in insulating quilts. These methods all require manual labor to be performed in order to position the perishables within or around the passive thermal control medium. Insulating quilts only provide a heat loss barrier. Water ice, dry ice, and gel packs maintain cold temperatures only temporarily through limited conductive heat transfer. Dry ice is the coldest of these materials, being at temperatures of around −80 degrees Celsius, and require special safety gear in order to avoid injury. Water ice will melt, becoming liquid that may damage perishables. Neither water ice nor dry ice is reusable, and while gel packs are reusable, they are only effective at temperatures above freezing. While such methods have been proven to work sufficiently, there is great potential for improvement in the passive thermal control of air transportation.

Another area of concern is the time it takes to transport large quantities of temperature sensitive products from one thermal control system to another. Having to transport products between freezers and transport units greatly increases the amount of heat energy that the products absorb due to the lack of thermal isolation from ambient temperatures which can exceed 100 degrees Fahrenheit. Any product whose temperature has already been steadily increasing throughout transportation will rise at an increasing rate not only during the time it itself is transported to the new thermal control system but the time it takes to transfer the rest of the products as well. A means of reducing the time spent transferring temperature sensitive products through high temperatures throughout the lifetime of a cold chain process is desirable.

SUMMARY

In one aspect, an active/passive freezer system consists of a payload bay surrounded by insulation, wherein the insulation can be foam, vacuum, Vacuum Insulated Panels (VIPs), or any combination therein; a heat exchanger, wherein the heat exchanger is comprised of a coolant tube within the payload bay, further comprising one or more cryogenic valves coupled to the heat exchanger; and a thermal battery, wherein the thermal battery is comprised of liquid water.

In another aspect, an active/passer freezer system consists of an insulated payload bay capable of reducing its temperatures to −90 degrees Celsius, a thermal battery capable of significantly decreasing passive heat gain of the payload bay, and is capable of both active freezing and passive maintaining of low temperatures.

In yet another aspect, an active/passive freezer system consists of
- a liquid Nitrogen inlet capable of convenient attachment to a customer's liquid Nitrogen supply;
- a cryogenic flow system that operates at a predetermined Nitrogen flow up to 500 psi;
- a payload bay surrounded by insulation that significantly reduces ambient heat gain;
- a heat exchanger to transfer thermal energy from the payload bay into itself, wherein liquid Nitrogen is the medium of energy transfer;
- one or more fans that significantly increase convective heat flow from the payload pay and into the heat exchanger; and
- a thermal battery that has a high specific heat and thus significantly increases the amount of thermal energy required to increase the payload bay temperature.

In another aspect, an active/passive freezer system consists of a method for reducing the temperature within a payload bay that is separate from a method of maintaining the temperature within a payload bay.

In another aspect, an active/passive freezer system is designed for reducing and maintaining a customer's product's temperature below a critical point, which if exceeded would damage the product. The active/passive freezer unit is designed to be capable of maintaining such low temperatures with much greater reliability than prior art products and methods, as well as significantly reducing the complexity and risk involved with cold chain management. The active/passive freezer unit is comprised of an insulated payload bay, an inlet for the customer's supply of a cryogenic liquid, such as Nitrogen, heat exchangers transferring heat from the payload bay to the cryogenic liquid through fast convective cooling, fans that greatly increase convective cooling, and a thermal battery to slow down the rise of temperature within the payload bay through heat gain.

One embodiment relies upon effective use of Nitrogen to reduce the payload bay temperature to temperatures below that of −90 degrees Celsius with ease in any situation. Liquid Nitrogen is easily transportable and a freezer that uses it doesn't require electricity to successfully reduce its temperature, thus such a freezer could be used in almost any location, including, most notably, the runway of an airport. The temperature of a payload bay that only uses passive means of cooling will steadily increase as a function of time. The longer such a payload bay is left with only passive maintenance of temperature the warmer it will get. Thus, it is very desirable to reduce the amount of time a payload bay's temperature is being maintained by passive means only. The embodiment's capability to actively cool a payload bay right up until the moment of transport significantly increases the ease of cold chain management.

One embodiment contains fans designed for increasing the air flow within a payload bay. This increased air flow greatly increases the convective cooling properties of a freezer, translating to significant reductions in freezing time. Decreased freezing time increases the ease and simplicity of cold chain management. While the preferred embodiment contains fans, it should be noted that the active/passive thermal control system doesn't require fans. Some situations do not require the shortened time of cooling the fans enable or do not have electricity for the fans to run. Using the active/passive thermal control system without fans is still effective and adds additional flexibility and capability.

One embodiment contains a thermal battery that is made up of a substance with a very high specific heat. The higher the specific heat of a substance, the more thermal energy is required to increase the temperature of said substance by a specific amount when compared to a substance with a lower specific heat. Thus, a payload bay with such a thermal battery will passively maintain lower temperatures longer than a similar payload without a thermal battery. This translates to a storage unit that can be flown for longer and thus father, decreasing complexity. This capability paired with that of greater reliability is of significant benefit to cold chain management.

Advantages of the system may include one or more of the following: Increased reliability for the transportation of sensitive frozen goods; Increased capability of maintaining lower temperatures within a payload bay, increasing the amount of time a temperature-sensitive product can be transported and thus simplifying its transportation process; and increased simplicity in cold chain management in the form of reducing the number of storage cell switches, due to the utility, mobility, and freezing capability of the system. The system greatly decreases the complexity of transporting such materials while simultaneously having an increased ability at maintaining such material's quality relating to temperature. This is done by combining liquid Nitrogen freezing technology, superior insulation materials, and a thermal battery. The system enables active and passive thermal control of perishable goods and yet it can easily and effectively meet all the differing requirements of a cold chain process.

DESCRIPTION

A detailed description of several preferred embodiments of the active/passive freezer system is provided herein. It is to be understood that the preferred embodiments may be embodied in various forms, however. Therefore, specific details disclosed herein are not to be interpreted as limiting, but rather as a basis for the claims and as a representative basis for teaching one skilled in the art how to employ the preferred embodiments in virtually any appropriately detailed system.

The preferred embodiment has the dual capability of active freezing and passive temperature maintenance, making it versatile in the cold chain. In particular, it can be used to flash freeze produce; transport temperature sensitive goods at ultra-low temperatures, with both active and/or passive control; have separate units for cooling and storing temperature sensitive goods; and be used in any part of cold chain processes in any combination.

Figure 1:
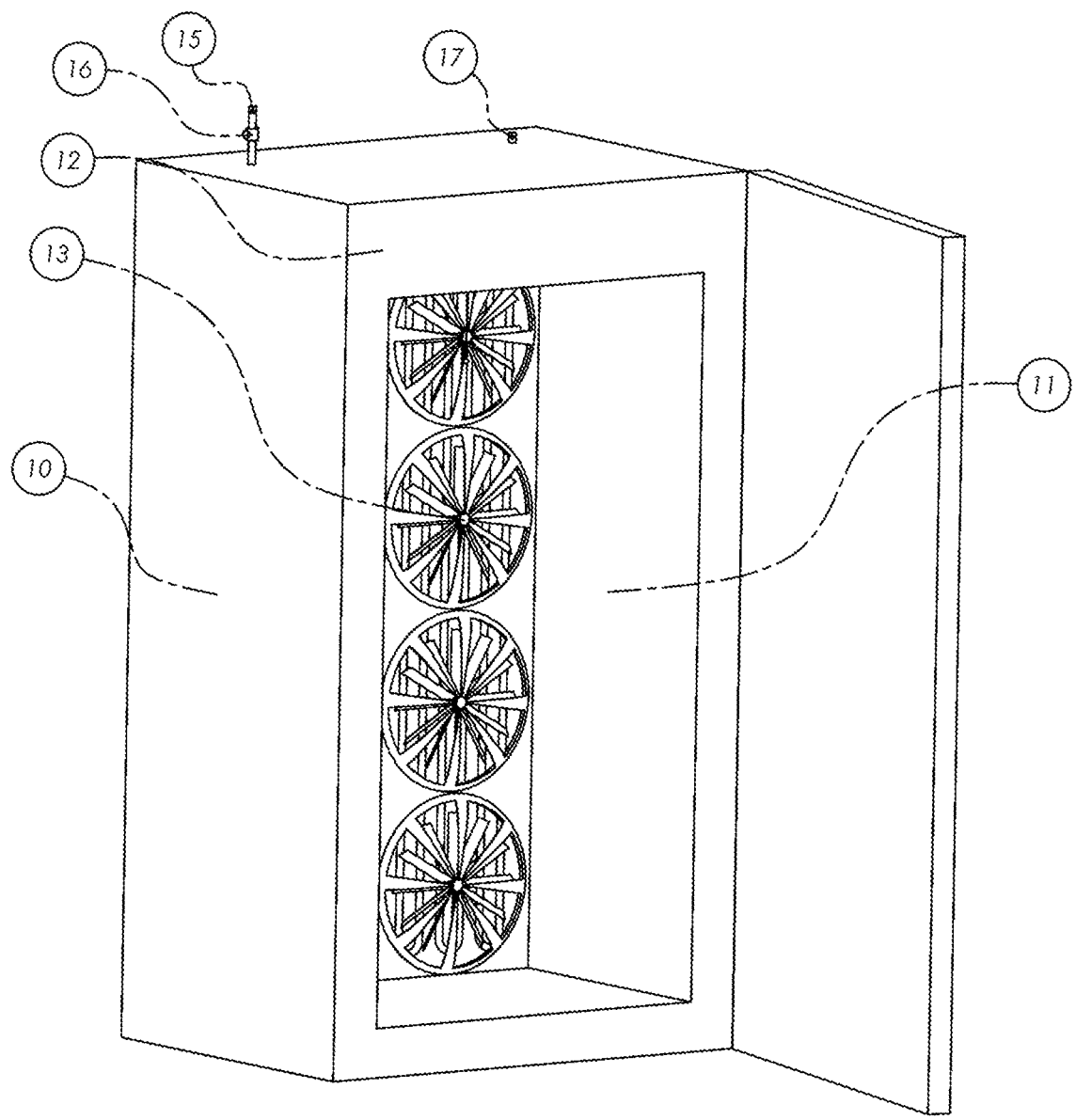
FIG. 1 is an exemplary 3D perspective view of an upright blast freezer version of the Active/Passive Freezer System.
Figure 2:
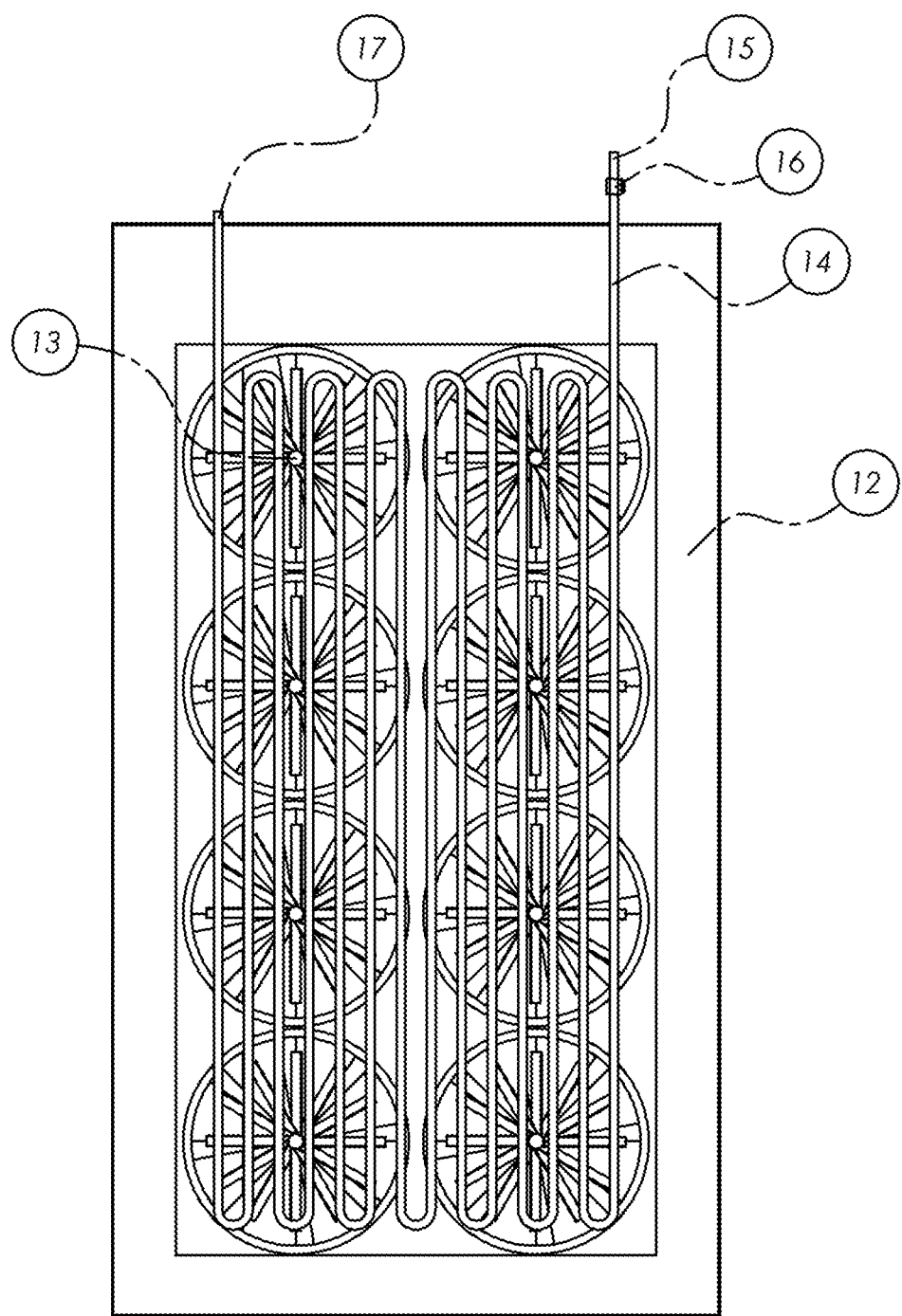
FIG. 2 is an exemplary sectional view of the interior of an upright blast freezer version of the Active/Passive Freezer System, specifically demonstrating its heat exchanger and fans.
Figure 3:
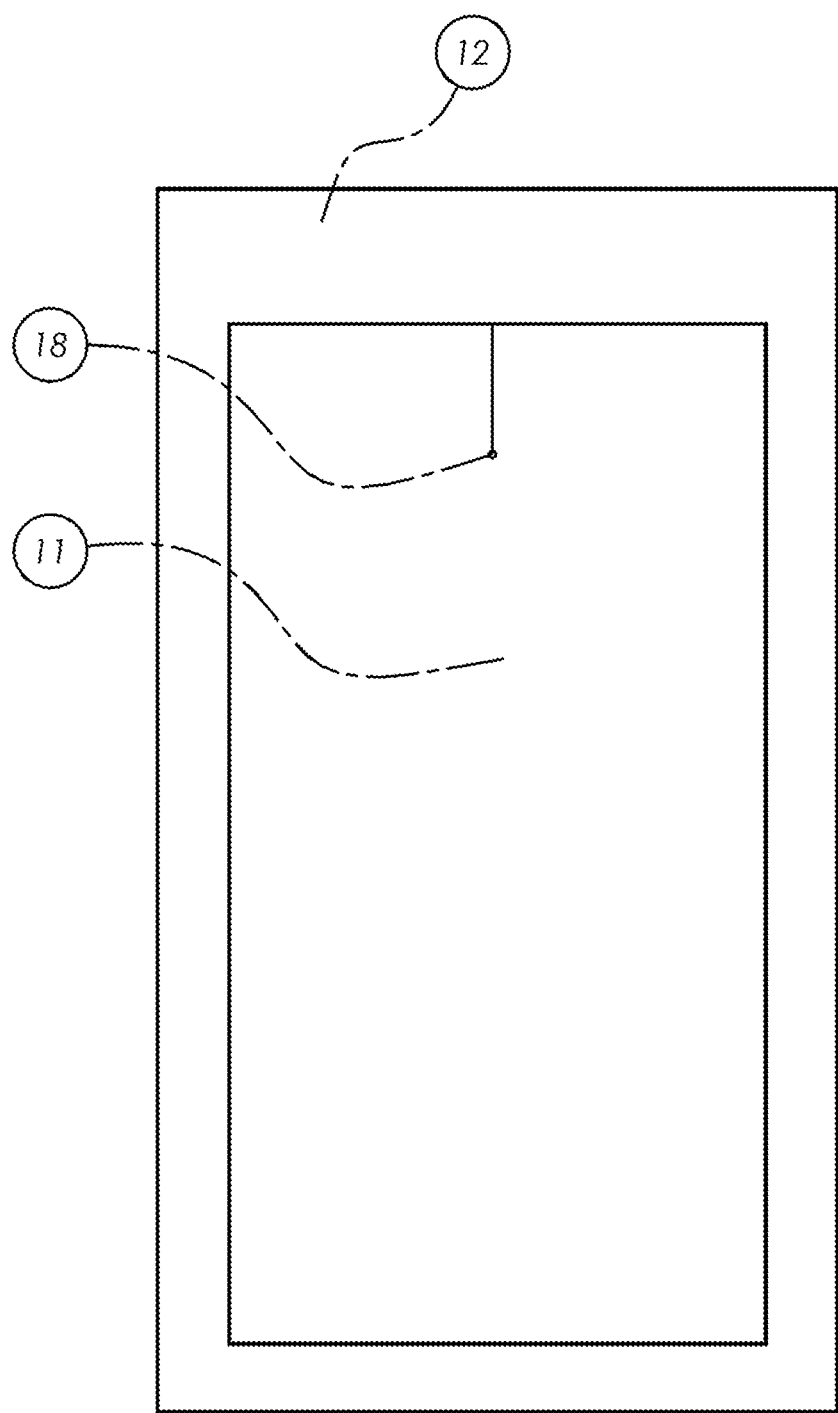
FIG. 3 is an exemplary sectional view of the interior of an upright blast freezer version of the Active/Passive Freezer System, specifically demonstrating its payload bay.

Now referring to FIGS. 1-3, an exemplary embodiment is a freezer unit 10 with a payload bay 11 that is surrounded by insulation 12. One or more fans 13 are within the payload bay 11. A heat exchanger 14 is within the payload bay 11 behind one or more fans 13. The heat exchanger 14 can be connected to an external liquid Nitrogen source at the LN2 inlet 15. A cryogenic valve 16 automatically controls the flow of liquid Nitrogen into the LN2 inlet 15. The flow of liquid Nitrogen exits at the LN2 outlet 17. A thermocouple 18 is within the payload bay 11.

The exemplary embodiment relies upon the effective use of liquid Nitrogen to reduce the temperature of the control volume. Liquid Nitrogen boils at the temperature of −196 degrees Celsius, thus remaining at the temperature of −196 degrees Celsius until all the liquid phase has turned into a gas phase. Nitrogen has a relatively high specific heat and because of this is capable of removing heat, or rather having heat transferred to it, from the environment around it to a great degree. The cryogenic valve 16 draws liquid Nitrogen in through the LN2 inlet 15, which then draws in heat from the payload bay 11 through the heat exchanger 14. The liquid phase of Nitrogen within the heat exchanger 14 turns into the gaseous phase as it absorbs the thermal energy from the payload bay 11 and removes it from the control volume as it exits through the LN2 outlet 17.

Because liquid Nitrogen is −196 degrees Celsius, it is capable of reducing the temperature within the payload bay 11 to −196 degrees Celsius relatively fast when compared to other refrigerants whose boiling temperature is much higher. Refrigerants whose boiling temperature is higher than that of Nitrogen will also be incapable of reducing the temperature of a control volume to −196 degrees Celsius because they can only reduce the temperature of a control volume to their boiling temperature. Liquid Nitrogen doesn't require a compressor and thus electricity to effectively reduce temperature, giving it a distinct advantage over other refrigerants. It is also environmentally friendly—the majority of Earth's breathable air is Nitrogen—and doesn't have any hazards beyond that of cold temperatures and a risk of oxygen deprivation in badly ventilated areas. These characteristics combine to make liquid Nitrogen not only more effective than other refrigerants but just as economical, if not more.

The exemplary embodiment relies upon the increased convective thermal energy transfer due to circulating air flow from the fan(s) 13 to increase the rate at which the temperature within the payload bay 11 is decreasing. Conductive heat transfer occurs when there is no fluid flow and isn't as effective as convective heat transfer, which is essentially conductive heat transfer with fluid flow. The use of convective thermal energy transfer significantly decreases the amount of time it takes to reduce the temperature within the payload bay 11 when compared the sole use of conductive thermal energy transfer.

Experimental data from a freezer of similar convective thermal energy transfer capabilities to the exemplary embodiment can reduce the temperature of it's payload bay from ambient temperatures to −80 degrees Celsius in under ten minutes.

The exemplary embodiment relies upon the heat exchanger 14 to transfer thermal energy from the payload bay 11 into the Nitrogen within it without altering the atmospheric composition of the payload bay 11. Maintaining the Nitrogen within the heat exchanger 14 protects the products placed within the payload bay 11, without significantly reducing the system's ability at reducing thermal energy within the payload bay 11.

The exemplary embodiment relies upon the insulation 12 that surrounds the payload bay 11 to minimize heat gain from the external environment. Heat transfer can occur in three ways, being: 1. Conductive heat transfer, which is when the sensible internal energy of particles is transferred linearly. Sensible internal energy includes the translational, rotational, and vibrational energies of a particle; 2. Convective heat transfer, which is when conductive heat transfer is assisted by the fluid flow of particles, and; 3. Radiation heat transfer, which is when thermal energy is transferred as energetic photons are absorbed by matter. Heat transfer from the external environment to the payload bay 11 in the form of radiation and convection are negligible under normal circumstances. Heat transfer from the external environment to the payload bay 11 in the form of conduction isn't negligible and needs to be minimized, however. Materials with low thermal conductivity allow less heat to flow through them than materials with high thermal conductivity. Insulation materials with low thermal conductivities reduce the effect of heat conduction. The payload bay 11 is surrounded by insulation 12 made up of foam, vacuum, Vacuum Insulated Panels (VIPs), or any combination therein, which reduced the thermal conductivity of the payload bay 11 and thus significantly reduces heat gain from the outside environment.

Experimental data from a freezer of similar insulation and volume capability to the exemplary embodiment showed that the temperature within the freezer increases by 10 degrees Celsius approximately every two hours. The only significant mass within the insulated portion of the freezer is 102 kilograms of stainless steel. The volume of the insulated portion of the freezer is 0.7047 cubic meters. Using the equation $Q=mc_p\Delta T$, the amount of energy required to raise the temperature within the freezer with product inside can be theoretically determined. Q is the heat energy required to increase the temperature of a set amount of mass by a certain amount, m is the mass, $c_p$ is the specific heat of the substance, and $\Delta T$ is the change in temperature. With $$m = 102 \text{ kg}, c_p = 0.5\frac{\text{kJ}}{\text{kg} \cdot K}, \text{ and } \Delta T = 10° \text{ C.} =$$

$$10K: Q = mc_p\Delta T = (102 \text{ kg}) * \left(0.5\frac{\text{kJ}}{\text{kg} \cdot K}\right) * (10K) = 510 \text{ kJ}$$

This calculation shows that 510 kilojoules of heat energy is transferred into the insulated portion of the freezer every two hours. Assume that 85% of the volume of the freezer is filled with fish, the density of fish $\rho_{fish}$ is $$920\frac{\text{kg}}{m^3},$$

and that the specific heat of fish $c_{fish}$ is $$1.7\frac{\text{kJ}}{\text{kg} * K}.$$

The heat energy required to increase the temperature within the payload bay by a certain amount $Q_{total}$ is now determined as follows:

$$Q_{total} = \Delta T(m_{steel}c_{psteel} + V_{fish}\rho_{fish}c_{pfish})$$

$$Q_{total} = 10*(102*0.5 + 0.85*0.7047*920*1.7) \approx 9,880 \text{ kJ}$$

The amount of energy required to warm the insulated portion of the freezer up 10 degrees Celsius with 85% of its volume being filled with fish is nearly 20 times as much, translating roughly to a theoretical time of approximately 20 hours for the freezer's contents to warm up by 10 degrees Celsius. These numbers are assuming a constant specific heat, which in reality depends on the current temperature and would shorten this time. However, the concept is still shown that with superior insulation the heat gain of temperature sensitive products is significantly reduced. The longest flight in the world is under 20 hours and with an active/passive freezer unit 1 one could transport fish or any product of comparable specific heat anywhere within the world with only a temperature drop of 10 degrees Celsius.

The exemplary embodiment's effective use of liquid Nitrogen, convective heat transfer, a heat exchanger, and insulation allows it to be used in situations that require rapid temperature drops or shortened time-frames along with the capability to be actively controlling the temperature within the payload bay 11 or just passively maintaining it. For example, pork from Oklahoma needs to be transported across the country immediately following slaughter. It needs to be frozen as quickly as possibly and then transported without electricity by truck to Washington where it will be sold as high-quality and fresh to consumers, stores, and restaurants. The drive from Oklahoma to Washington is 29 hours non-stop. Using the exemplary embodiment, 1.5 tons of recently harvested pork can be frozen to −80 degrees Celsius in less than 4 hours and then placed on the truck to be shipped. After 30 hours of passive temperature maintenance the pork is −73 degrees Celsius. The quality of the pork is kept to extreme levels unheard of with current state-of-the-art technology.

Figure 4:
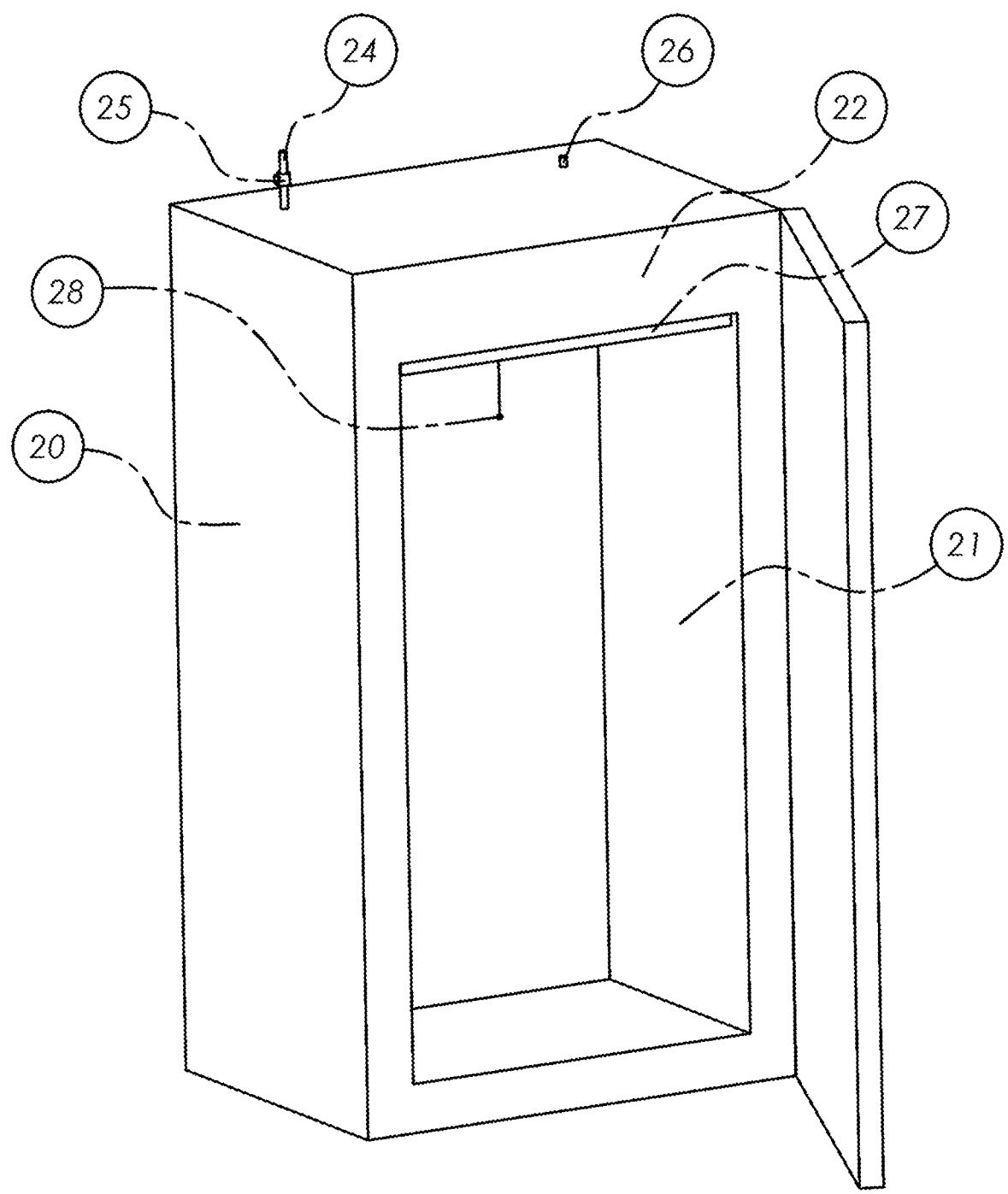
FIG. 4 is an exemplary 3D perspective view of the interior of an upright freezer version of the Active/Passive Freezer System.
Figure 5:
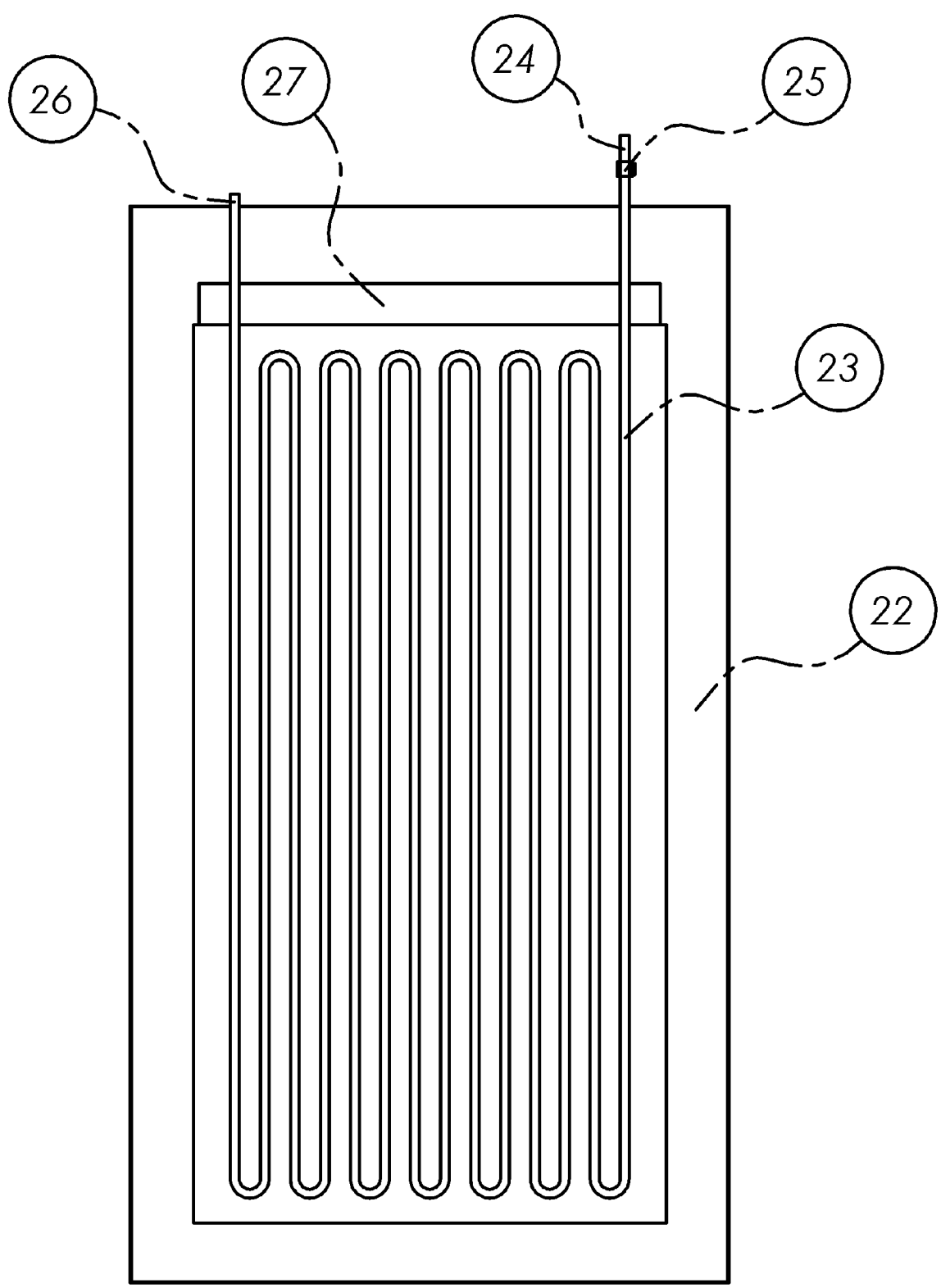
FIG. 5 is an exemplary sectional view of the interior of an upright freezer version of the Active/Passive Freezer System, specifically demonstrating its heat exchanger.
Figure 6:
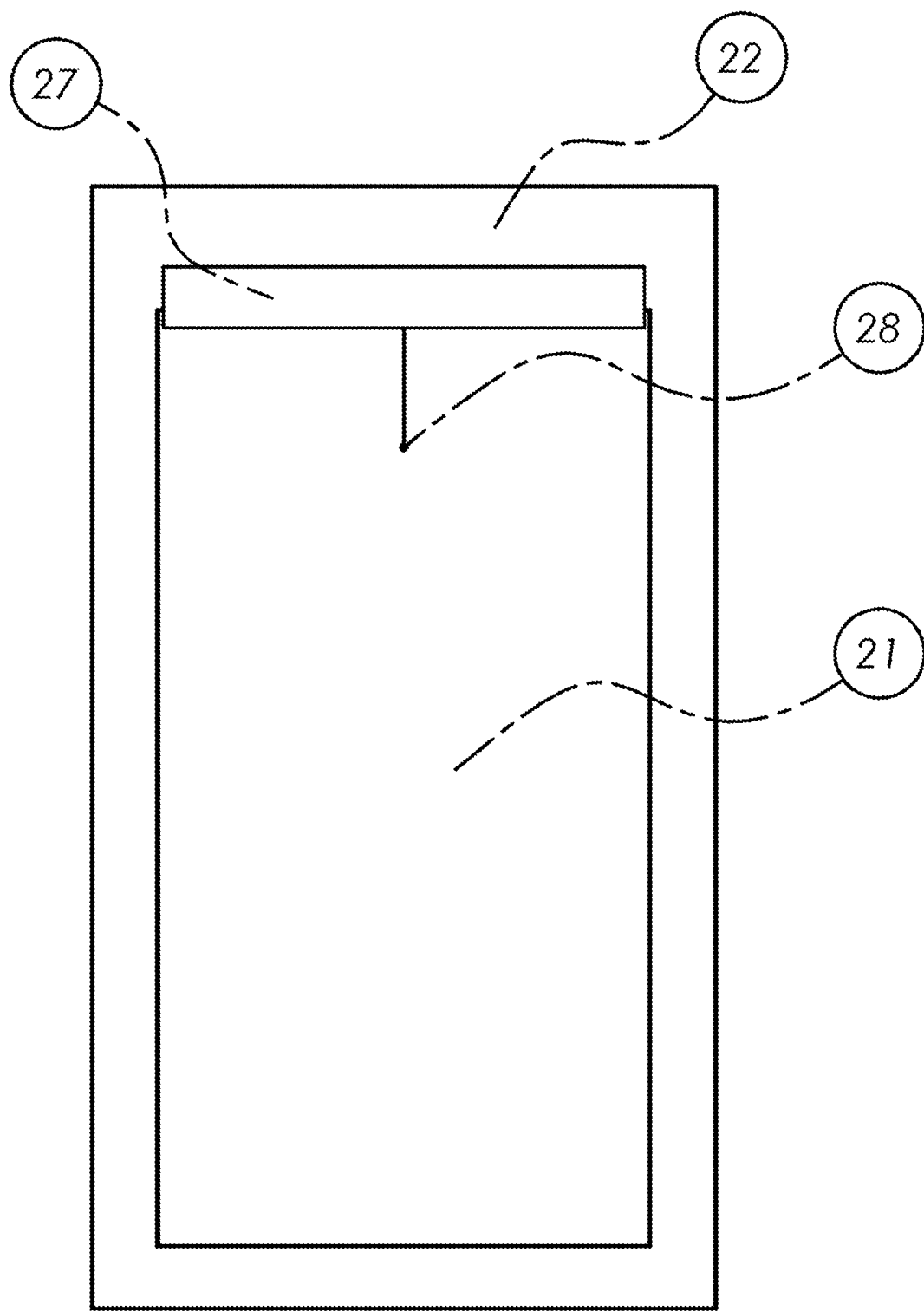
FIG. 6 is an exemplary sectional view of the interior of an upright freezer version of the Active/Passive Freezer System, specifically demonstrating its payload bay.
Figure 7:
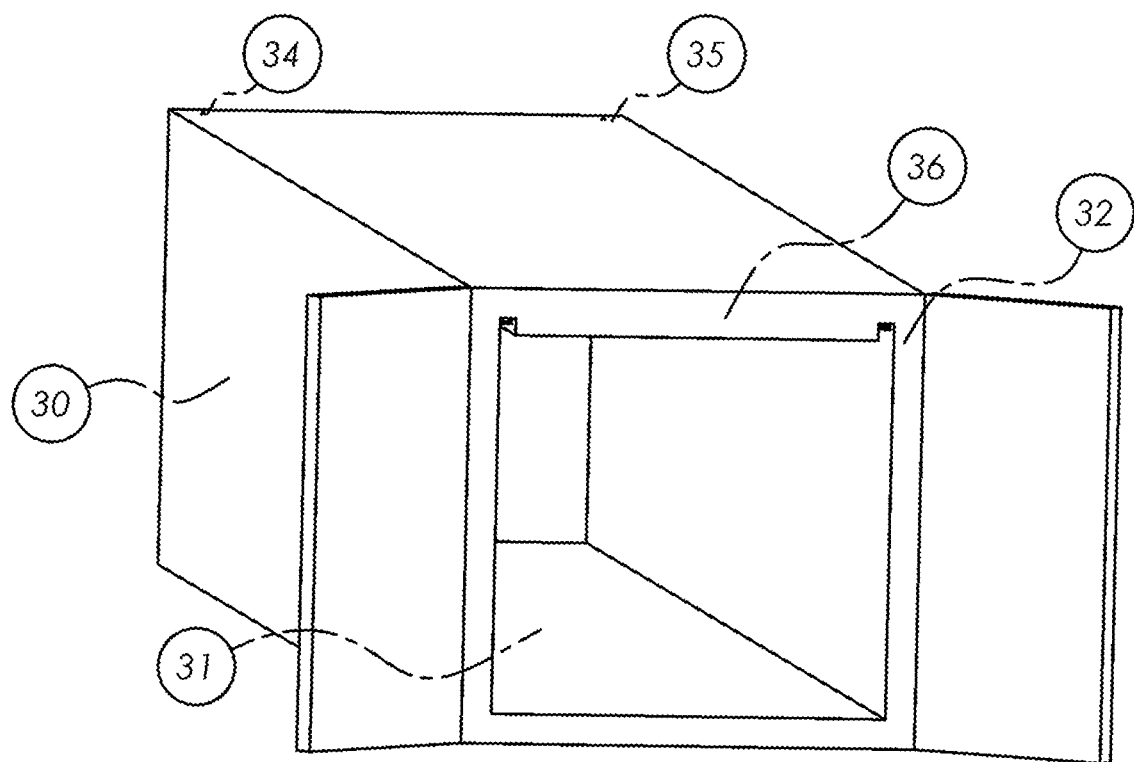
FIG. 7 is an exemplary 3D perspective view of a reefer version of the Active/Passive Freezer System
Figure 8:
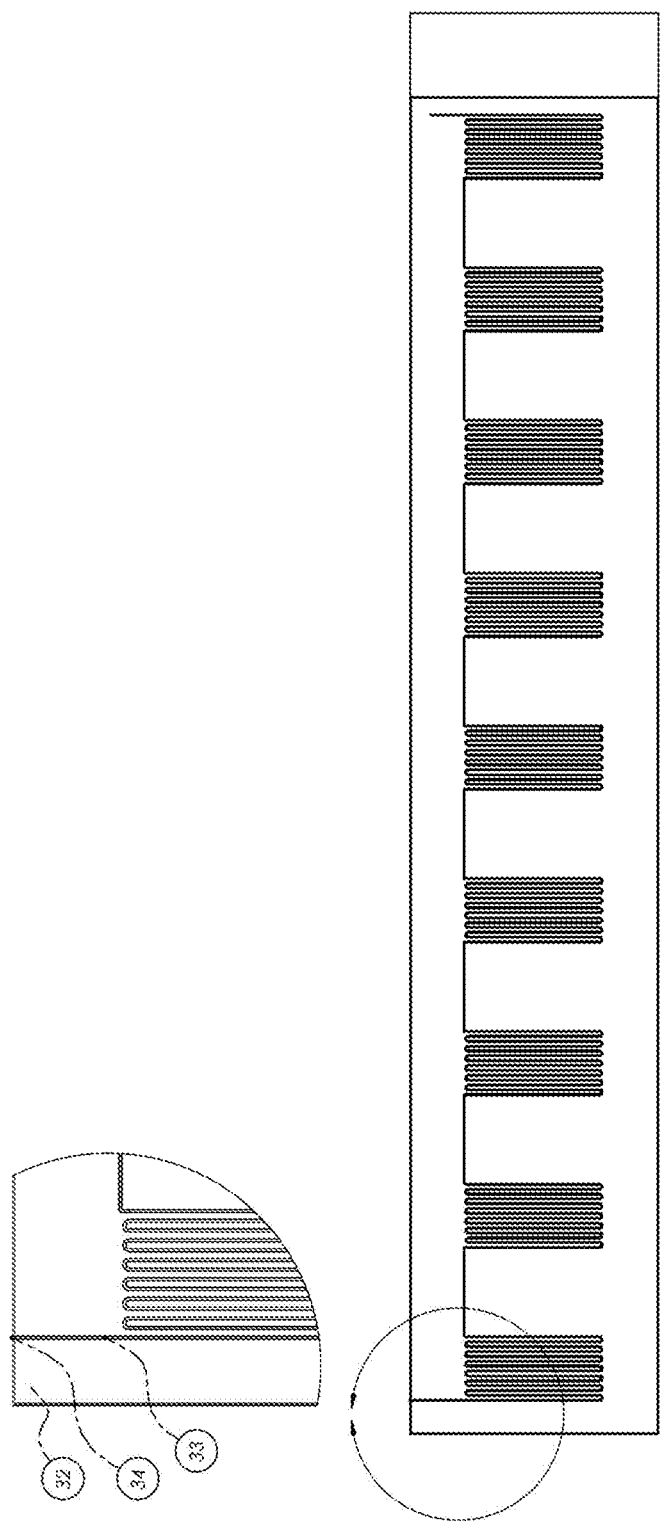
FIG. 8 is an exemplary sectional view of the interior of a reefer version of the Active/Passive Freezer System, specifically demonstrating its heat exchanger.
Figure 9:
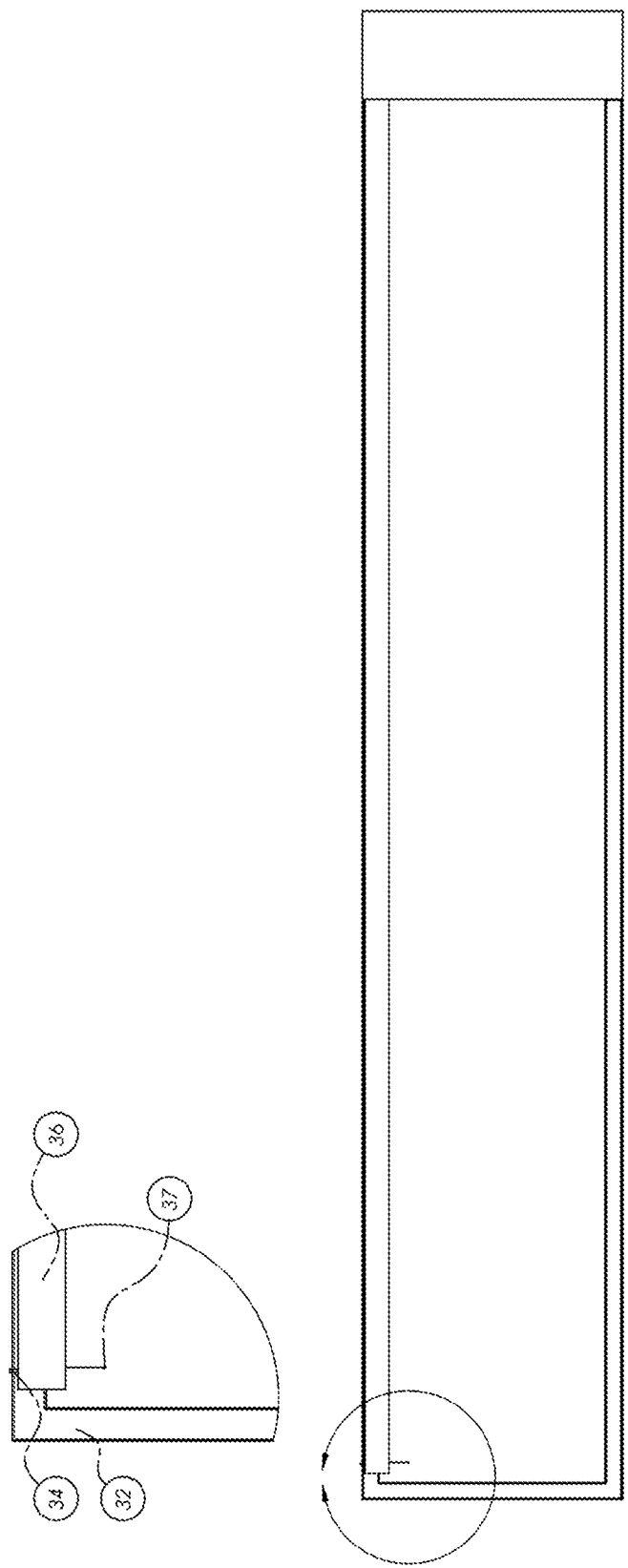
FIG. 9 is an exemplary sectional view of the interior of a reefer version of the Active/Passive Freezer System, specifically demonstrating its payload bay.
Figure 10:
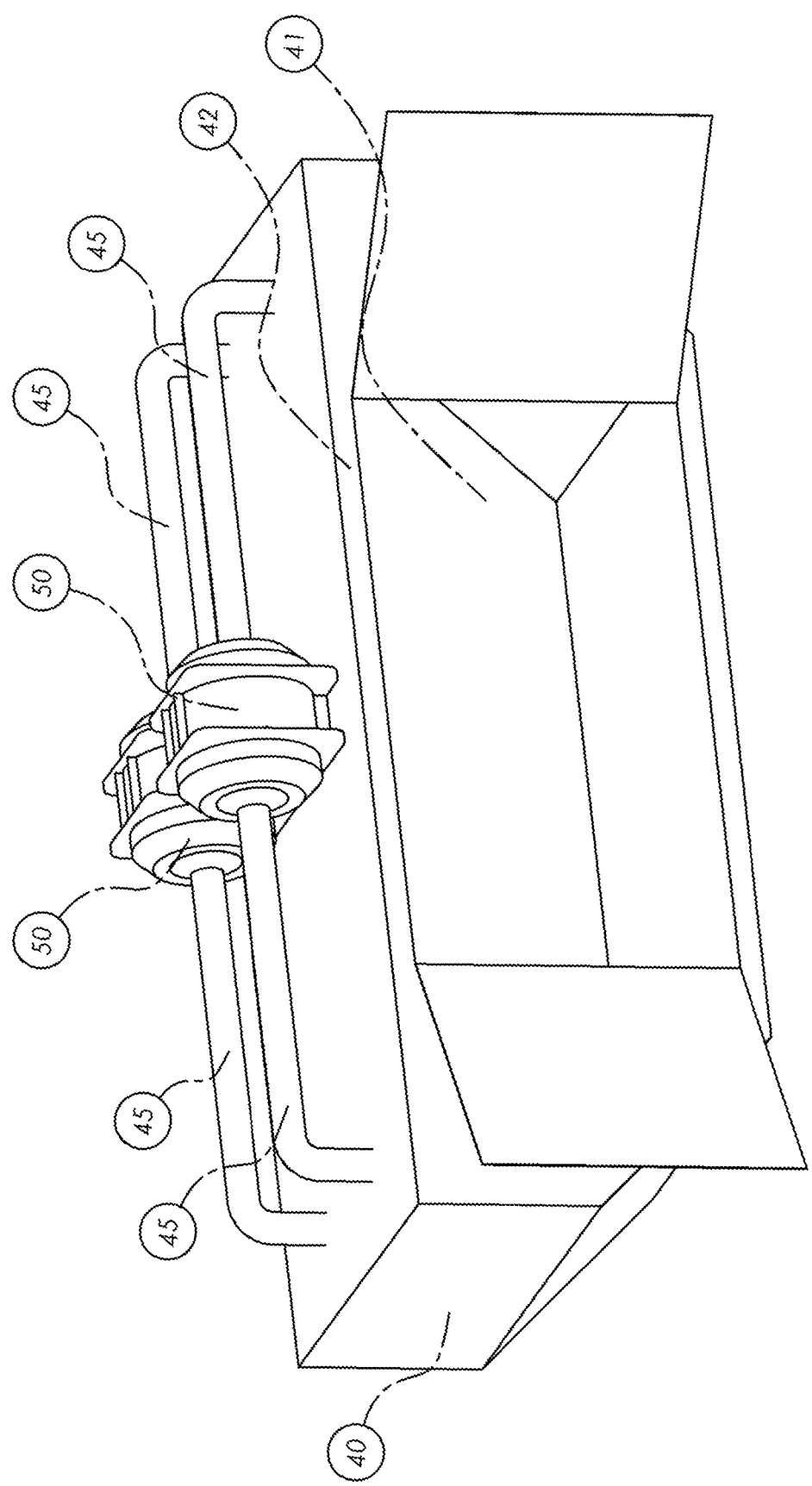
FIG. 10 is an exemplary 3D perspective view of an air transit version of the Active/Passive Freezer System, with the portable air chiller units.
Figure 11:
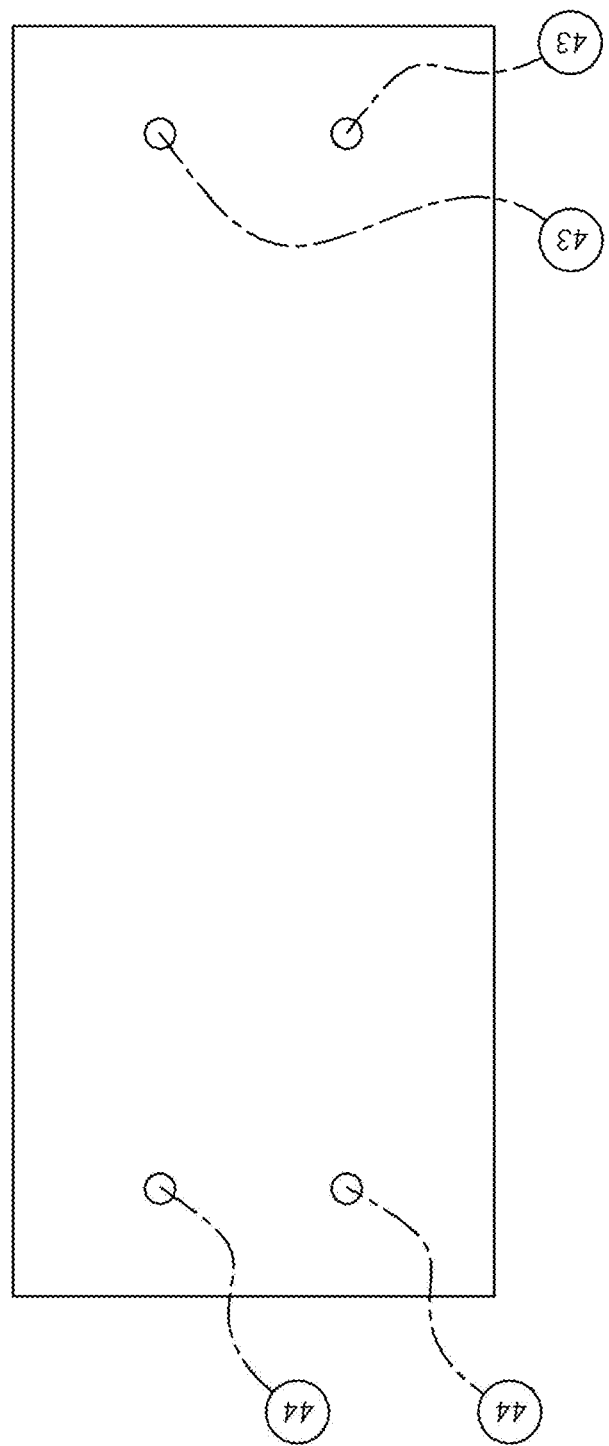
FIG. 11 is an exemplary sectional view of the top of an air transit version of the Active/Passive Freezer System, specifically demonstrating its air inlets and outlets.
Figure 12:
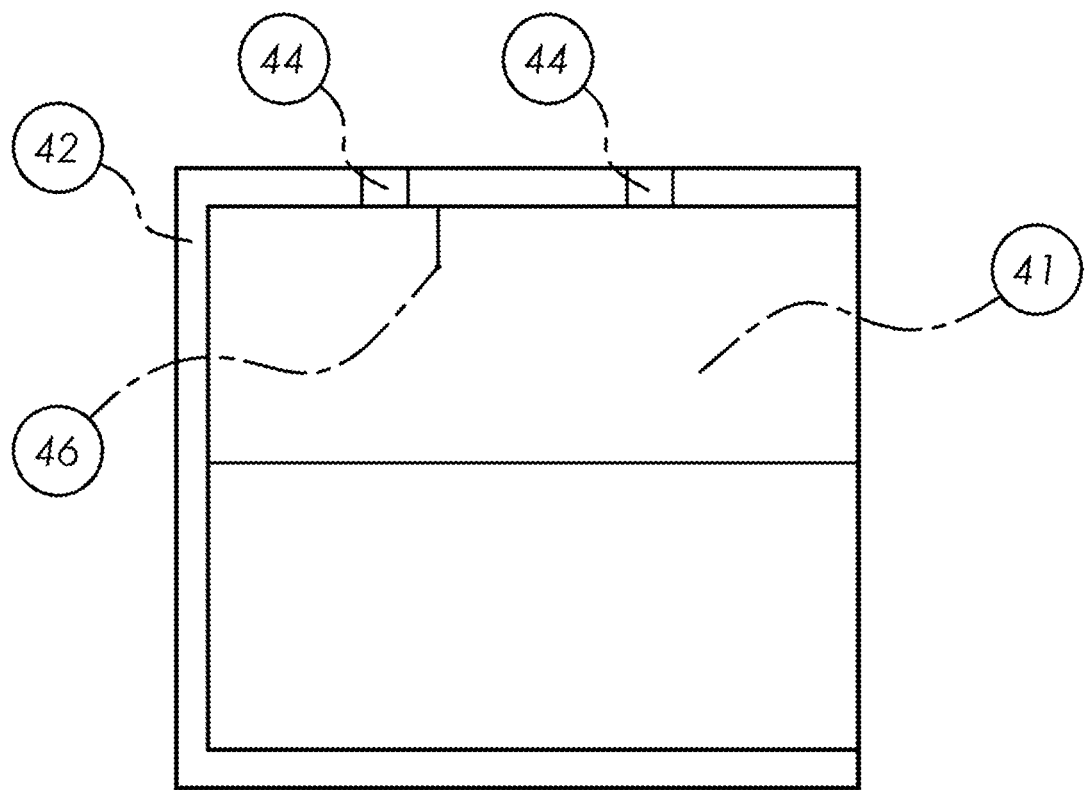
FIG. 12 is an exemplary sectional view of the interior of an air transit version of the Active/Passive Freezer System, specifically demonstrating its payload bay.
Figure 13:
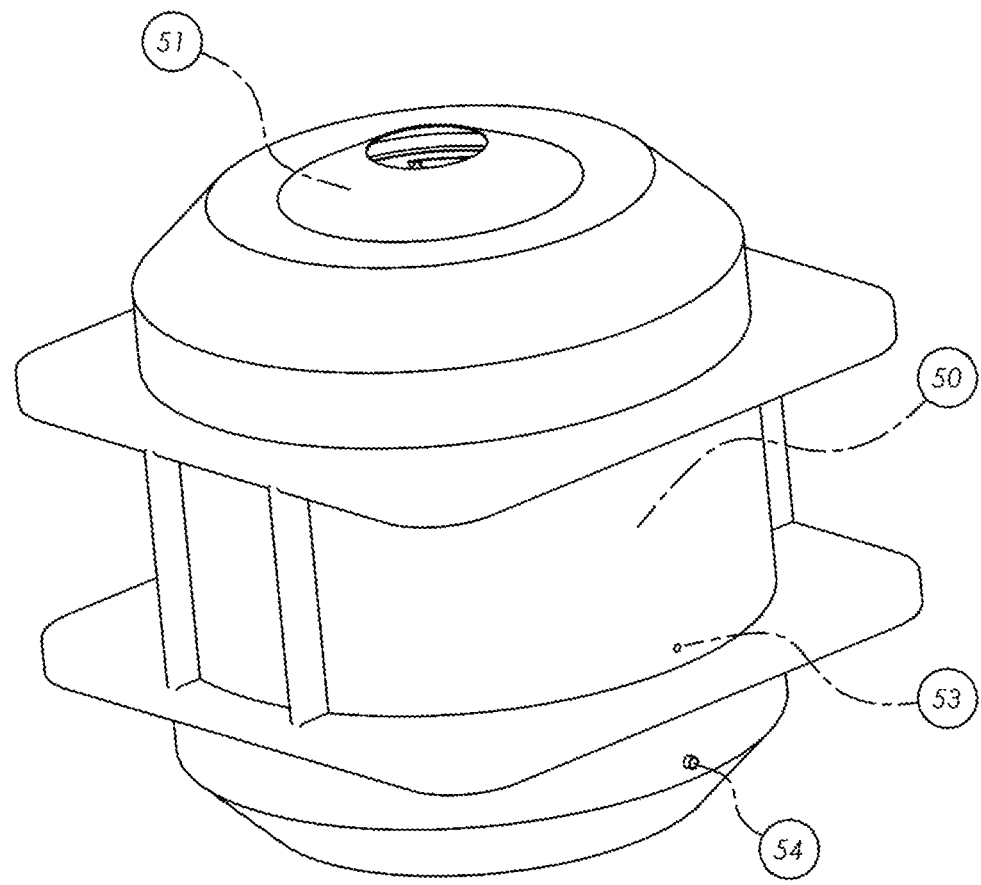
FIG. 13 is an exemplary 3D perspective view of a portable air chiller used in the Active/Passive Freezer System.
Figure 14:
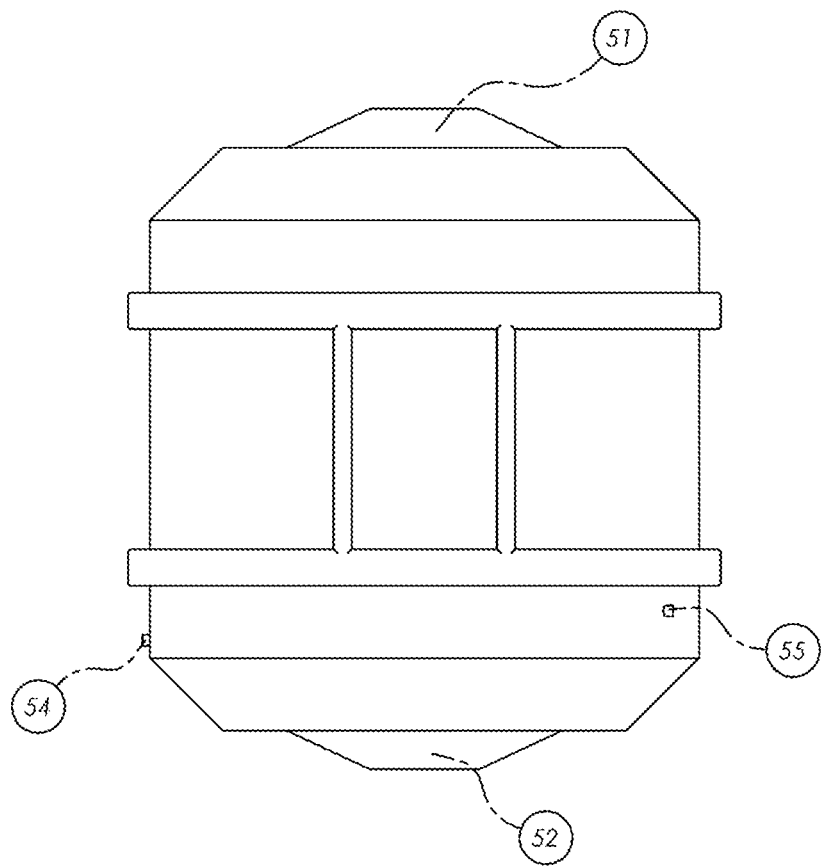
FIG. 14 is an exemplary side view of a portable air chiller used in the Active/Passive Freezer System.
Figure 15:
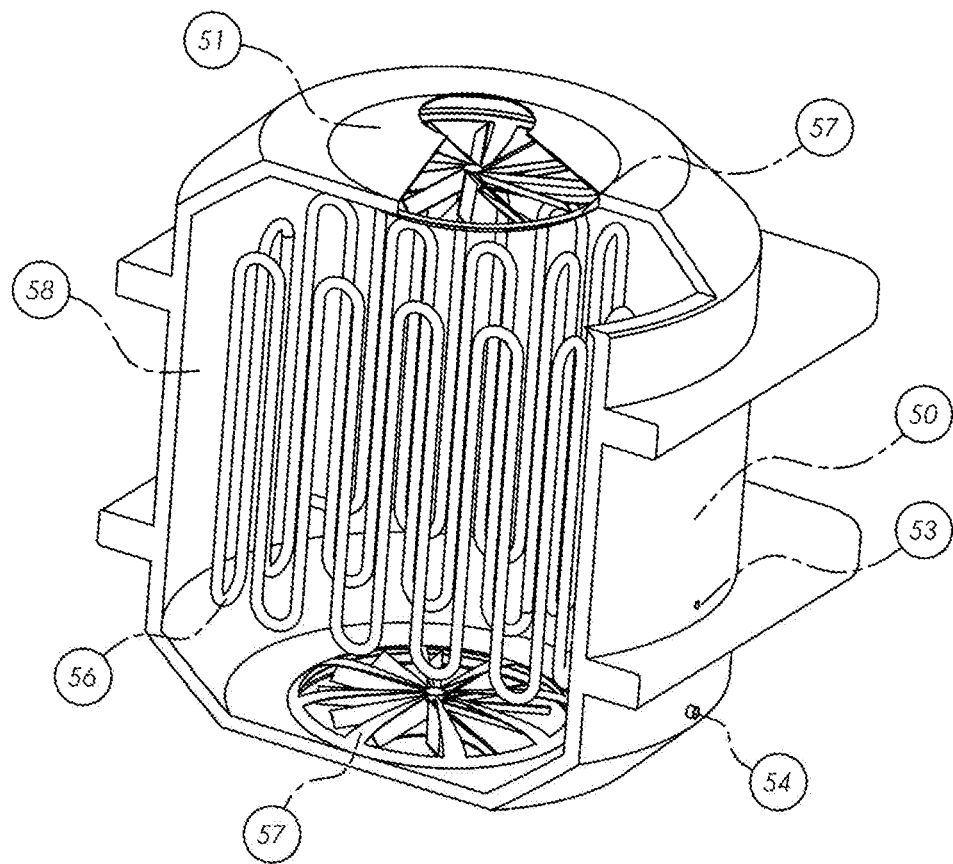
FIG. 15 is an exemplary 3D perspective view of the interior of a portable air chiller used in the Active/Passive Freezer System, specifically demonstrating its heat exchanger and fans.

Now referring to FIGS. 4-6, an exemplary embodiment is a freezer unit 20 with a payload bay 21 that is surrounded by insulation 22. A heat exchanger 23 is within the payload bay 21 with an LN2 inlet 24. A cryogenic valve 25 controls the flow of liquid Nitrogen into the LN2 inlet 24. The Nitrogen exits at an LN2 outlet 26 attached to the exit of the heat exchanger 23. The heat exchanger 23 can be connected to an external liquid Nitrogen source at the LN2 inlet 24. A thermal battery 27 is located at the top of the payload bay 21. A thermocouple 28 is within the payload bay 21.

The exemplary embodiment relies upon the effective use of liquid Nitrogen, thermal energy transfer through a heat exchanger, and insulation of low thermal conductivity in order to function properly. The exemplary embodiment's use of liquid Nitrogen, a heat exchanger, and insulation is the same as that of the exemplary embodiment's referred to in FIGS. 1-3. Liquid Nitrogen is highly effective at absorbing thermal energy from the environment surrounding it. In conjunction with a heat exchanger, thermal energy can be absorbed from the environment surrounding the heat exchanger and transferred to the Nitrogen within in. This is accomplished without exposing the Nitrogen to the outside environment. Materials of superior insulation properties prevent heat transfer, or in other words can maintain a colder temperature within a box of such materials for longer periods of time than other materials. The effective use of liquid Nitrogen, thermal energy transfer through a heat exchanger, and insulation of low thermal conductivity enables the exemplary embodiment to reduce the temperature its payload bay 21 and maintain low temperatures within effectively and efficiently.

The exemplary embodiment relies upon the careful usage of a manual cryogenic valve 25 to control the flow of liquid Nitrogen through the heat exchanger 23. Many locations throughout the world do not have access to electricity or such access is extremely costly. In the United States electricity costs just over $0.10 per kilowatt-hour. In some places throughout Europe electricity costs $0.30 or more with many other locations costing over $0.20. It is beneficial and perhaps necessary for some locations for a method of shipping temperature-sensitive products without electricity. Liquid Nitrogen is relatively easy to produce and transport, and as such is easily accessible. A shipping method that doesn't require electricity while still being capable of transporting products at extremely cold temperatures is desirable. The temperature drop within a cryogenic freezer using liquid Nitrogen is easily determined as a function of time and Nitrogen flow rate. The exemplary embodiment's usage of a manual cryogenic valve 25 doesn't significantly complicate freezing operations while enabling usage without electricity, especially when used in conjunction with a means of temperature measurement.

The exemplary embodiment's effective use of a manual cryogenic valve 25 allows it to be used in situations without electricity and with the capability to be actively controlling the temperature within the payload bay 21 or just passively maintaining it. For example, a shipment of exotic meat is to be transported within Egypt by rail. The meat requires cryogenic temperatures to be maintained at the desired quality, but the train doesn't provide electricity. Using the exemplary embodiment, a few tons of the exotic meat can be manually frozen to cryogenic temperatures and then transported passively to its end use location while only dropping at most tens of degrees Celsius. The quality of the exotic meat is kept at high standards while being transported without the use of electricity.

The exemplary embodiment may rely upon the thermodynamic properties of a thermal battery 27 to prolong cold temperatures within the payload bay 21. Materials have an intensive property called specific heat, $c_p$, that is used in the equation $Q=mc_p\Delta T$. The equation $Q=mc_p\Delta T$ determines the amount of heat energy Q that is required to raise the temperature T of a specific amount of mass m by a set amount. The greater the specific heat $c_p$ of a material the more heat energy Q is required to raise its temperature T. An example of a substance with a high specific heat $c_p$ is water, which has a specific heat $$c_p = 4.181 \frac{kJ}{kg*K}.$$

An amount of material of high specific heat $c_p$ will increase the amount of heat energy required to raise the temperature of the payload bay 21 by a set amount, or in other words, will increase the time it takes for the payload bay 21 to increase in temperature by a set amount. The use of a thermal battery 27 made of a material of high specific heat in the preferred embodiment enhances its capability to maintain low temperatures.

Experimental data from a freezer of similar insulation and volume capability to the preferred embodiment referred to in FIGS. 1-3 is also applicable to the preferred embodiment referred to in FIGS. 4-6. The temperature within the freezer increases from −80 degrees Celsius to −70 degrees Celsius in approximately two hours with only 102 kilograms of stainless steel as mass that is thermally significant. By the equation $Q=mc_p\Delta T$ and with mass m=102 kg, specific heat of steel $$c_{psteel} = 0.5 \frac{kJ}{kg*K},$$

and change in temperature $\Delta T$=10 K:

$$Q = mc_{psteel}\Delta T = (102 \text{ kg}) * \left(0.5\frac{kJ}{kg \cdot K}\right) * (10K) = 510 \text{ kJ}$$

The heat energy Q that entered the freezer in two hours was 510 kilojoules, or 4.25 kilojoules per minute.

Using a similar freezer with an additional 50 liters of frozen water $$\left(c_{pice} = 2.01\frac{kJ}{kg*K}\right)$$

yields the following equation:

$$Q = \Delta T(m_{steel}c_{psteel} + m_{ice}c_{pice})Q =$$
$$(10K) * \left((102 \text{ kg}) * \left(0.5\frac{kJ}{kg \cdot K}\right) + (50 \text{ kg}) * \left(2.01\frac{kJ}{kg \cdot K}\right)\right) = 1,515 \text{ kJ}$$

The heat energy Q required to raise the temperature within the freezer by 10 degrees Celsius when it has 50 liters of water acting as a thermal battery is three times as much as when there wasn't a thermal battery within the freezer. It is natural for the time for a freezer's interior to raise in temperature to increase when any mass is added. This may lead one to believe that a thermal battery is unnecessary, which in some cases it would be. However, there are cases when a thermal battery would be beneficial. For example, the Herpes Zoster Vaccine (HZV) is recommended by the CDC to be stored between −50 and −15 degrees Celsius. The specific heat of HZV $c_{pHZV}$ can be assumed to be that of ice, or $$2.01\frac{kJ}{kg \cdot K}.$$

The freezer has the capability to store 72,000 2 milliliter vials that has a mass $m_{vial}$=2.2 g. Each vial stores 2 milliliters of HZV for a total of 144 kilograms. The specific heat of glass is $$c_{pglass} = 0.84 \frac{kJ}{kg \cdot K}.$$

These values yield the following equation for the freezer to raise in temperature by fifteen degrees:

$$Q = (15K) * (m_{steel}c_{psteel} + m_{ice}c_{pice} + m_{glass}c_{pglass} + m_{HZV}c_{pHZV})Q =$$
$$(15K) * \left((102 \text{ kg}) * \left(0.5\frac{kJ}{kg \cdot K}\right) + (50 \text{ kg}) * \left(2.01\frac{kJ}{kg \cdot K}\right) + \right.$$
$$\left.(158.4 \text{ kg}) * \left(0.84\frac{kJ}{kg \cdot K}\right) + (144 \text{ kg}) * \left(2.01\frac{kJ}{kg \cdot K}\right)\right) = 8,610 \text{ kJ}$$

144 kilograms of HZV can be passively stored in the freezer with a thermal battery of 50 kilograms for approximately 34 hours and drop from −40 degrees Celsius to −25 degrees Celsius, staying within the CDC's suggestion by ten degrees Celsius. This compares to a freezer without a thermal battery:

$$Q = (15K) * (m_{steel}c_{psteel} + m_{glass}c_{pglass} + m_{HZV}c_{pHZV})Q =$$
$$(15K) * \left((102 \text{ kg}) * \left(0.5\frac{kJ}{kg \cdot K}\right) + (50 \text{ kg}) * \left(0.84\frac{kJ}{kg \cdot K}\right) + \right.$$
$$\left.(144 \text{ kg}) * \left(2.01\frac{kJ}{kg \cdot K}\right)\right) = 7102 \text{ kJ}$$

The freezer with no thermal battery can passively store the same amount of HZV for 28 hours. This shows that the thermal battery increases the capability of the freezer by 21%, a significant marg The effectiveness of the thermal battery can be increased further by bringing the temperature of the thermal battery down to a temperature lower than that of the vaccine. Assume the same conditions for the freezer with a thermal battery except that the thermal battery will start at −80 degrees Celsius:

$$Q = (15K) * (m_{steel}c_{psteel} + m_{glass}c_{pglass} + m_{HZV}c_{pHZV}) + (65K) * (m_{ice}c_{pice})Q =$$

$$(15K) * \left((102 \text{ kg}) * \left(0.5 \frac{kJ}{kg \cdot K}\right) + (158.4 \text{ kg}) * \left(0.84 \frac{kJ}{kg \cdot K}\right) + (144 \text{ kg}) * \left(2.01 \frac{kJ}{kg \cdot K}\right)\right) + (65K) * \left((50 \text{ kg}) * \left(2.01 \frac{kJ}{kg \cdot K}\right)\right) = 13,635 \text{ kJ}$$

This increases the time the vaccine can be passively stored to 53.5 hours, a 57.4% increase over the freezer with a thermal battery kept at the same temperature as the HZV and a 91% increase over the freezer without a thermal battery. While the true times may differ due to specific heats of materials being a function of temperature, it is easily seen that a thermal battery greatly increases a freezer's passive temperature maintenance capability. This increase of capability is more significant as less mass is stored in the freezer or as the average specific heat of the materials within the freezer drops. The preferred embodiment's usage of a thermal battery 27 enhances its versatility.

Now referring to FIGS. 7-10, an exemplary embodiment is a reefer unit 30 with a payload bay 31 that is surrounded by insulation 32. A heat exchanger 33 lines both walls of the reefer unit's 30 interior with an LN2 inlet 34 and an LN2 outlet 35 attached on the entrance and exit respectively of the heat exchanger 33. The heat exchanger 33 can be connected to an external liquid Nitrogen source at the LN2 inlet 34. A thermal battery 36 can be located at the top of the payload bay 31. A thermocouple 37 is within the payload bay 31.

The exemplary embodiment relies upon the effective use of liquid Nitrogen, thermal energy transfer through a heat exchanger, and insulation of low thermal conductivity in order to function properly. It may also rely upon a thermal battery to enhance passive temperature maintenance capabilities. The exemplary embodiment's use of liquid Nitrogen, a heat exchanger, and insulation is the same as that of the exemplary embodiment's referred to in FIGS. 1-3. Liquid Nitrogen is highly effective at absorbing thermal energy from the environment surrounding it. In conjunction with a heat exchanger, thermal energy can be absorbed from the environment surrounding the heat exchanger and transferred to the Nitrogen within in. This is accomplished without exposing the Nitrogen to the outside environment. Materials of superior insulation properties prevent heat transfer, or in other words can maintain a colder temperature within a box of such materials for longer periods of time than other materials. A thermal battery increases the amount of heat energy required to raise the temperature within the payload bay 21. The effective use of liquid Nitrogen, thermal energy transfer through a heat exchanger, and insulation of low thermal conductivity enables the exemplary embodiment to reduce the temperature its payload bay 21 and maintain low temperatures within effectively and efficiently.

A common method of transportation within the United States is the use of large trucks. The size of containers transported by trucks are regulated, typically being a long rectangular prism shape. The preferred embodiment demonstrates that an active/passive freezer system can be used with this method of transportation. Truck drivers are allowed to drive 11 hours per day with 10 hours of rest each day. It takes 44 hours to drive from New York to California, or four days of driving. The capability to use a single reefer, or temperature-controlled trailer unit, throughout the entire time spent transporting is greatly beneficial and cost reducing. The preferred embodiment is capable of being used in this situation because of its insulation, temperature maintenance capability, and novel design of being capable to be used as both an active and passive system of temperature maintenance. For example, a truckload of mutton needs to be transported from New York to California. The mutton is loaded into the payload bay 31 of a reefer unit 30 using an active/passive system. The reefer unit 30 is connected to an LN2 supply on the truck at the LN2 inlet 34. As the truck is being driven, the reefer unit 30 is actively maintaining the temperature of the payload bay 31 by pushing Nitrogen through the heat exchanger 33 which draws in thermal energy from the payload bay 31 and removes it from the system by exiting the LN2 outlet 35. The driver of the truck can easily monitor the temperature within the payload bay 31 because of the thermocouple 37 within the payload bay 31. Because of the insulation 32, the driver of the truck can stop for even several hours without risking the mutton within the truck increasing above a temperature at which it will spoil. The driver can stop at truck stops for the required ten hours and the reefer unit 30 will passively maintain its temperature below a certain temperature for a significant amount of time. A thermal battery 36 is used to ensure that the temperature within the payload bay 31 will remain below a critical point for the entire time the driver cannot drive. Once the required ten hours are passed, the driver resumes his driving and the reefer unit 30 begins to actively control the temperature of its payload bay 31 again. This can repeat however many times is necessary, which in this case is four days. The mutton is transported with one system without spoilage, and with extreme ease of use.

Now referring to FIGS. 11-15, an exemplary embodiment is an air transit unit 40 with a payload bay 41. The payload bay 41 is surrounded by insulation 42. Air inlets 43 allow air flow to come into the payload bay 41 when applicable and thermally seal the payload bay 41 when no air flow is needed. Air outlets 44 perform the same function as the air inlets 43 except they allow air flow to exit the payload bay 41. Tubing 45 connects the air inlets 43 to the cold air exhaust 51 of the portable air chiller 50. Tubing 45 also connects the air outlets 44 to the warm air intake 52 of the portable air chiller 50. A thermocouple 46 is within the payload bay 41. A cool chamber 58 is within the portable air chiller 50. A pressure equalizer 53 allows air to enter within the portable air chiller's 50 cool chamber 58. An LN2 inlet 54 connects to a liquid Nitrogen supply. A heat exchanger 56 connects the LN2 inlet 54 to an LN2 outlet 55 within the cool chamber 58. Nitrogen flows from the LN2 inlet 54 to the LN2 outlet 55 through the heat exchanger 56 and draws thermal energy from within the cool chamber 58, effectively reducing the temperature within the cool chamber 58. Fans 57 are positioned within the cool chamber 58 and oriented so that air flow is drawn from the warm air intake 52, across the heat exchanger 56, and out the cold air exhaust 51. The air from within the payload bay 41 of the air transit unit 40 is cycled through the portable air chiller 50 as the portable air chiller 50 reduces the air's temperatures.

The air transit unit 40 of the exemplary embodiment relies upon insulation of low thermal conductivity to function properly. The exemplary embodiment's use of insulation is the same as that of the exemplary embodiment's referred to in FIGS. 1-3. Materials of superior insulation properties prevent heat transfer, or in other words can maintain a colder temperature within a box of such materials for longer periods of time than other materials. The effective use of insulation materials of low thermal conductivity enables the exemplary embodiment to maintain low temperatures within the payload bay 41 of the air transit unit 40 longer and more effectively.

The portable air chiller 50 of the exemplary embodiment relies upon the effective use of liquid Nitrogen and thermal energy transfer through a heat exchanger to function properly. The exemplary embodiment's use of liquid Nitrogen and a heat exchanger is the same as that of the exemplary embodiment's referred to in FIGS. 1-3. Liquid Nitrogen is highly effective at absorbing thermal energy from the environment surrounding it. In conjunction with a heat exchanger, thermal energy can be absorbed from the environment surrounding the heat exchanger and transferred to the Nitrogen within in. This is accomplished without exposing the Nitrogen to the outside environment. The effective use of liquid Nitrogen and thermal energy transfer through a heat exchanger enables the exemplary embodiment to reduce the temperature its payload bay 21 effectively and efficiently.

The exemplary embodiment's separation of the thermally isolated payload bay 41 from the portable air chiller 50, or the means by which the payload bay 41 reaches low temperatures, enables a device that is extremely lightweight for its thermal isolation properties. This is of extreme benefit for transportation methods whose cost increase significantly with added mass, such as air transportation. For example, a load of Oysters is to be transported from Australia to Canada in freezing temperatures by plane. The cost to fly freight depends on either the actual mass of cargo or the volumetric mass. In general, the heavier cargo is the more it costs to fly. This is true for most types of shipping but is especially true for air freight. The load of frozen Oysters is placed inside the payload bay 41 of the air transit unit 40 with the portable air chiller 50 attached to the air transit unit 40 by tubing 45. The portable air chiller 50 reduces the payload bay 41 temperature until the thermocouple 46 reads the desired temperature. The already frozen Oysters are frozen to the initial air transport temperature so that the insulation 42 of the air transit unit 40 can maintain the Oysters above a critical temperature during transport. The portable air chiller 50 and tubing 45 are removed and the air inlets 43 and air outlets 44 are sealed. The air transit unit 40 is then placed aboard a plane that will transport it and the Oysters to Canada. The extra mass of the portable air chiller 50 does not accompany the shipment as it is shipped, reducing costs significantly. The insulation 42 of the air transit unit 40 can be changed in amount and thickness in order to further minimize mass while maintaining desirable thermal insulation properties, thus maximizing cost efficiency. The separation of the means of actively freezing the payload bay 41 and the payload bay 41 itself maximizes the capability of the air transit unit 40.

Figure 16:
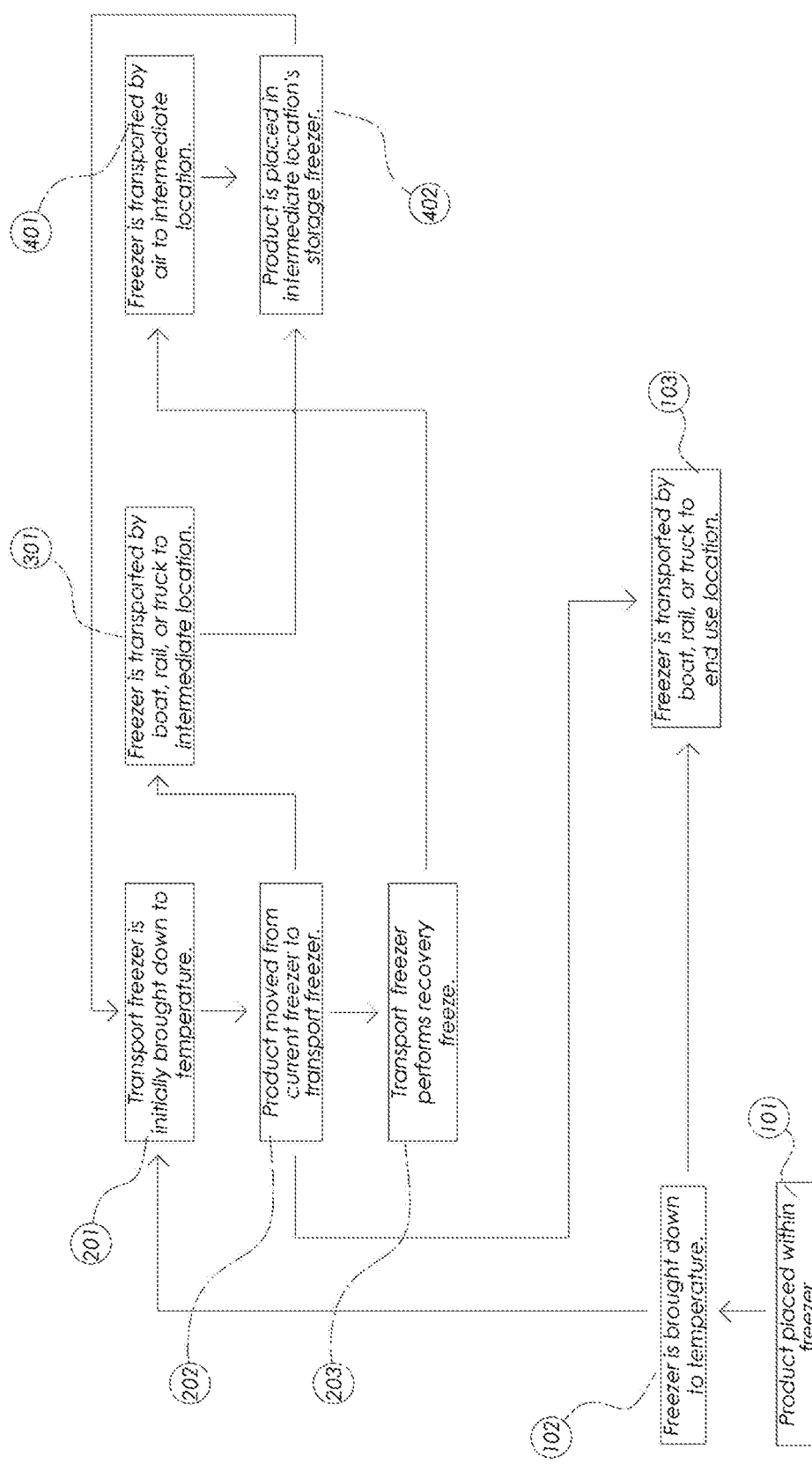
FIG. 16 is an exemplary flowchart of some possible cold chain operations using an Active/Passive Freezer System.

Now referring to FIG. 16, the preferred embodiment is used in an exemplary cold chain operation as exemplified by the flowchart. A Bluefin Tuna is caught and then placed within a freezer 101, whether the preferred embodiment or not. The freezer is brought down to temperature 102 and, if the freezer is the preferred embodiment, can be transported to the end use location 103 using active temperature control methods on a boat, train, or truck. Alternatively, a transport freezer is brought down to temperature 201 and then the Bluefin Tuna is removed from the original freezer and placed within the transport freezer 202. The transport freezer has the capability to perform a recovery freeze 203. The transport freezer can then be transported to the end use location 103 or intermediate location 301 using active temperature control methods on a boat, train, or truck or to an intermediate location by air 401 using active temperature maintenance. The Bluefin Tuna is moved from the transport freezer to the intermediate location's freezer 402. The Bluefin Tuna can then be moved to another transport freezer 202 and transported to the end use location 103.

Referring to FIGS. 1-16, the following are other examples of the capability and flexibility of the active/passive freezer system:

A load of fish is caught and placed within a freezer 101, the freezer unit 10. The fish are blast frozen 102 in order to preserve the quality and texture of the fish. The freezer unit 10 is transported by boat to the end use location of the fish 103 while using active cooling methods.

Recently slaughtered beef is placed within a freezer 101, the freezer unit 10. The beef is blast frozen 102 and then the freezer unit 20 is brought down to temperature 201. The frozen beef is placed in the freezer unit 20 to be transported 202. The freezer unit 20 is then transported by rail to the end use location 103 using active cooling methods.

The freezer unit 20 is manually brought to extremely cold temperatures so that the thermal battery 27 is frozen extremely cold. A single frozen Pig corpse is then placed inside the freezer 101. The freezer unit 20 is transported by truck for a lengthy period of time to the end use location 103. Because of the significant amount of empty space within the freezer, the temperature rise will increase more rapidly. The thermal battery 27 is brought down to a lower temperature so that it can absorb more thermal energy and prolong the time the freezer unit 20 is below critical levels.

Freshly harvested Chicken breast is placed within a freezer 101 and blast frozen 102 using the freezer unit 10. The frozen Chicken is then moved to the reefer unit 30 with other frozen goods 202. The reefer unit 30 is driven while its temperature is passively maintained to a port 301. The entire reefer unit 30 is moved from the truck onto a cargo boat. The reefer unit 30 is then transported while using active freezing methods to the end use location 103.

Freshly caught Salmon is placed within a freezer 101 and brought down to temperature 102 using the freezer unit 10. The frozen Salmon is moved 202 into another freezer unit 20 and transported to an airport 301. The frozen salmon is moved 202 into the air transit unit 40. The air transit unit 40 is brought down to temperature 203 using the portable air chiller 50. The air transit unit 40 is then transported to another location while using passive temperature maintenance methods 401. The air transit unit 40 is once again actively frozen 203 using the portable air chiller 50 located at the recipient's airport. The Salmon is then transported to the end use location 103.

A shipment of Vaccines is placed within a transport freezer 102, the freezer unit 10. The freezer unit 10 is actively transported to a storage facility 301 where the vaccine is safely and reliably stored while only using passive temperature maintenance methods until it can be shipped again. The freezer unit 10 is then actively transported to the end use location 103.

The active/passive freezer system's unique and novel capability to be used in any step of a cold chain process relies upon the extremely advantageous properties of liquid Nitrogen, superior insulation materials, increased convective air flow due to fans, thermal energy absorption properties of a thermal battery, the capability to have separate devices for reducing the temperature of a payload bay and maintaining the temperature of a payload bay, or any combination of any number of these capabilities. The active/passive freezer system's unique and novel capability to be easily and effectively used in any step of a cold chain process relies upon the ability to be configured in different and distinct embodiments capable of active temperature control, passive temperature maintenance, or the combination of active temperature control and passive temperature maintenance.

The active/passive freezer system's usage of liquid Nitrogen, superior insulation materials, increased convective air flow due to fans, thermal energy absorption properties of a thermal battery, the capability to have separate devices for reducing the temperature of a payload bay and maintaining the temperature of a payload bay, or any combination of any number of these capabilities enables it to be used easily and effectively in conjunction with transportation by land, sea, or air. It can be configured to be heavier, more capable, and more reliable for transportation methods allowing it. It can be configured to be used solely with a supply of liquid Nitrogen so as not to require electricity. It can be configured to be scaled for large scale storage capabilities or smaller scaled capabilities. It can be configured so that solely the insulated portion of the system is transported.

The active/passive freezer system's preferred embodiments solve the problems of unreliable transportation methods of lesser capability and overly expensive transportation methods by novel cryogenic freezing technology and superior insulation methods that can be used in many configurations.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A system for transporting frozen goods, comprising:
   a payload bay surrounded by an insulation to provide passive temperature maintenance;
   a cryogenic heat exchanger coupled to the payload bay providing active temperature control;
   a valve coupled to the heat exchanger;
   one or more fans coupled to the payload bay; and
   a liquid thermal battery coupled to the one or more fans to provide passive temperature maintenance.

2. The system of claim 1, wherein the insulation comprises foam, vacuum, Vacuum Insulated Panels (VIPs), or any combination therein.

3. The system of claim 1, wherein the heat exchanger is comprised of a coolant tube and a liquid Nitrogen inlet capable of attachment to a liquid Nitrogen supply.

4. The system of claim 1, wherein the thermal battery includes water or a material with predetermined specific heat.

5. The system of claim 1, wherein the one or more fans create air flow, assisting in the thermal energy transfer from the air within the system to the heat exchanger.

6. The system of claim 1, wherein the cryogenic valve attaches to a supply of liquid Nitrogen.

7. The system of claim 1, wherein the cryogenic valve is processor controlled or manually controlled.

8. The system of claim 1, wherein the heat exchanger uses liquid Nitrogen to provide active temperature control.

9. The system of claim 1, wherein the insulation provides passive temperature maintenance.

10. The system of claim 7, wherein a manual operation of the cryogenic valve requires no electricity.

11. A method for transporting frozen goods, comprising:
    providing a payload bay surrounded by an insulation to provide passive temperature maintenance;
    cryogenically cooling the payload bay with active temperature control; and
    providing a liquid thermal storage to provide passive temperature maintenance; and
    precharging the liquid thermal storage prior to use.

12. The method of claim 11, comprising passively cooling the payload bay during use with the liquid thermal storage.

13. The method of claim 11, comprising insulating the payload bay with foam, vacuum, Vacuum Insulated Panels (VIPs), or any combination thereof.

14. The method of claim 11, comprising providing a coolant tube and a liquid Nitrogen inlet capable of attachment to a liquid Nitrogen supply.

15. The method of claim 11, wherein the thermal battery includes water or a material with a predetermined specific heat.

16. The method of claim 11, comprising applying one or more fans to create air flow, and assisting in the thermal energy transfer from the air within the system to a heat exchanger.

17. The method of claim 11, comprising electronically controlling a cryogenic valve coupled to a cryogenic source.

18. The method of claim 11, wherein the heat exchanger uses liquid Nitrogen to provide active temperature control.

19. The method of claim 11, comprising insulating the payload bay to provide passive temperature maintenance.

20. The method of claim 11, comprising precharging the thermal battery to a temperature below a recommended storage temperature of an item to be cooled by the payload bay.

* * * * *